United States Patent [19]

Keener et al.

[11] Patent Number: 5,550,990

[45] Date of Patent: Aug. 27, 1996

[54] PHYSICAL PARTITIONING OF LOGICALLY CONTINUOUS BUS

[75] Inventors: Don S. Keener, Boca Raton; Andrew B. McNeill, Deerfield Beach; Thomas H. Newsom, Boca Raton; Kevin L. Scheiern, Deerfield Beach; Richard W. Voorhees; Edward I. Wachtel, both of Boca Raton, all of Fla.

[73] Assignee: International Business Machines Corporation, Armonk, N.Y.

[21] Appl. No.: 400,425

[22] Filed: Mar. 3, 1995

Related U.S. Application Data

[63] Continuation of Ser. No. 901,337, Jun. 19, 1992, abandoned.

[51] Int. Cl.$^6$ .................................................. G06F 13/40
[52] U.S. Cl. ............................................ 395/309; 395/308
[58] Field of Search ............................... 395/325, 275, 395/250, 725, 425, 309, 306, 308

[56] References Cited

U.S. PATENT DOCUMENTS

| | | | |
|---|---|---|---|
| 4,716,525 | 12/1987 | Gilanyi et al. | 395/250 |
| 4,975,829 | 12/1990 | Clarey et al. | 395/275 |
| 5,117,486 | 5/1992 | Clark et al. | 395/250 |
| 5,140,691 | 8/1992 | Austruy et al. | 395/575 |
| 5,191,653 | 3/1993 | Banks et al. | 395/275 |
| 5,191,656 | 3/1993 | Forde, III et al. | 395/325 |
| 5,274,783 | 12/1993 | House et al. | 395/325 |

*Primary Examiner*—Jack B. Harvey
*Assistant Examiner*—Glenn A. Auve

[57] ABSTRACT

Arrangements for physically partitioning a bus having a well defined architecture as a physical entity, wherein the partitioning is logically transparent to a computer and devices which communicate through the bus and serves to avoid problems potentially arising because of the scope of actions permitted by the architecture. A typical bus architecture to which present arrangements have relevance is that associated with SCSI (Small Computer System Interface) buses. The potential problems allowed to occur architecturally involve: (a) exposures of data security/integrity; (b) excessive signal degradation due to use of signal rates which although allowed by the architecture are inappropriate for a particular bus loading environment also allowed by the architecture; (c) restrictions preventing parallel transfer of data between the computer and multiple storage devices; (d) restrictions unduly limiting the number of devices attachable to one logical bus path (one input-output channel of the computer). The disclosed arrangement partitions the bus into two or more physical entities which to the computer appears as one logical entity.

6 Claims, 6 Drawing Sheets

External Devices (7 or less)

9a Adapter  SCSI bus
5            9

Internal Devices (7 or less)
6

Motherboard 3
Housing 2
CPU 4

Partitioned Adapter 11
12a  11a    12b
        11b
6
CPU
3
2

11a 11b 5Mhz
10Mhz 6a  11a 11b

Limit access to 6a from other than host CPU to/from up to 15 devices 11a 11b to/from up to 15 devices 11a 11b Conduct transfers in external and internal paths concurrently

PHYSICAL PARTITIONING OF LOGICALLY CONTINUOUS BUS

This is a continuation of application Ser. No. 07/901,337 filed on Jun. 19, 1992, now abandoned.

FIELD OF THE INVENTION

This invention relates to bus systems for transferring data between computers and peripheral devices.

BACKGROUND OF THE INVENTION

Contemporary computer-peripheral bus systems, exemplified by the SCSI (Small Computer System Interface) bus as specified by American National Standards Institute (ANSI), allow for a variable number of devices to be positioned at variable distances from each other and from a host computer, along an electrically continuous bus, and to exchange data signals with the computer in baseband pulse form. Many such systems do not require signal filtering, yet signals transmitted may have sharp edge transitions. It has been observed that in some system configurations these signals may encounter bus impedance conditions preventing accurate reception, which in turn could result in system failures of potentially indeterminate nature.

Also, security of data stored in devices coupled to the bus taps, and intended for use of a particular computer linked to the bus, could be easily breached by other devices linked to the bus.

Furthermore, as such buses evolve to serve configurations not contemplated by developers of the original buses, control software executed by the host computer for initializing the bus configuration may become useless relative to new configurations, adding an undesirable software cost to the process of upgrading to the new configurations.

The present invention seeks to provide a bus arrangement which is suitable for efficiently alleviating these problems.

OBJECTS OF THE INVENTION

An object of this invention is to provide a bus system, for reliably linking varied numbers of peripheral devices to a computer, wherein bus connections of the devices may be variably spaced relative to each other and the computer and wherein the bus is logically configured to avoid one or more of the problems stated above while presenting to the computer the logical appearance of a physically continuous bus.

Another object is to provide a data bus, for connecting peripheral devices to a computer, which is arranged logically to appear as a continuous bus entity to the computer, but consists physically of plural bus partitions that are isolated from each other and which are accessible to the computer through distinctly separate conduction paths that are operable at different signalling rates; whereby data is transferrable over these paths at rates that can be effectively optimized in relation to transmission distances between the computer and devices linked to these paths and thereby effectively optimized for worst case impedance conditions that could be encountered in each path.

Another object is to provide a data bus system for reliably linking a computer with multiple devices positioned at various signalling distances from the computer and each other, wherein data is transferrable between the computer and devices at different rates designed to accomplish the transfers efficiently, in a manner transparent to the computer and devices, while minimizing the risk of signals representing the data being distorted beyond recognition.

Another object is to provide a data bus system for reliably linking multiple data handling devices with each other, said devices including a computer and at least one storage device, wherein the bus can be physically partitioned so as to selectively prevent devices other than the computer from accessing data stored in the storage device(s), while maintaining the appearance of the bus relative to the computer as a logically continuous entity.

Another object is to provide a logically continuous but physically partitioned data bus system, for reliably linking a computer with multiple devices, wherein the initial configuration of the bus can be electrically established under control of the computer, when the computer is running under control software designed specifically to configure a physically continuous bus system.

Another object is to provide a data bus system for connecting a computer with one or more peripheral devices including at least one storage device, wherein the bus system is adaptable to prevent access to the at least one storage device by any other peripheral device which could adversely affect data stored in the at least one storage device that is used by the computer. Another object is to provide a data bus system, for connecting a computer with peripheral devices, wherein the bus is made to appear to the computer as a single logical connection path for data, but is physically partitionable into plural segments that are electrically isolatable from each other and can be used to transfer data in distinctly different modes. A corollary object is to provide a segmentable bus as stated previously, wherein data is transferrable concurrently relative to devices attached to different bus segments so as to obtain more efficient transfers relative to such devices.

Another object is to provide a data bus adaptation system which interfaces to a bus which is physically partitionable into plural segments, while maintaining appearance of a logically continuous bus relative to a computer and peripheral devices attached to the segments; wherein the adaptation system is operable to maintain compatibility with control software in the computer that is designed specifically for configuring a bus system that is physically continuous.

SUMMARY OF THE INVENTION

These and other objects are realized by providing a partitionable bus adapting unit for interfacing between a computer system bus and a peripheral bus that links to peripheral devices. The adapting unit is provided with two or more ports which connect separately to discrete sections of the peripheral bus, relative to a bus system in which such sections normally would be continuously linked to each other through the adapting unit. Transfers of data between each unit port and the computer system bus are controlled separately within the adapting unit, while allowing the peripheral bus to be configured relative to the computer system as if it were logically a single continuous bus. The adapting unit is thereby capable of providing customized handling of data transfers relative to each of its peripheral bus ports.

In accordance with the invention, one application of this customized handling capability is to transfer data at different rates between the adapting unit ports and different sections of the bus, so as to avoid potential noise problems relative to one or more of the bus sections. In this application, the computer system, the adapting unit, and certain "internal"

devices linked to one peripheral port of the adapting unit, are all contained within a common housing enclosure; whereas other "external" devices that are linked to one or more other peripheral ports of the adapting unit are located either outside of or inside the common housing. Distances between the external devices and the adapting unit are large in relation to distances between the internal devices and that unit. Accordingly, data is transferrable between the internal devices and the adapting unit at a higher rate than data that is transmitted between the external devices and that unit.

In this and other applications the adapting unit may be adapted to conduct data transfer operations relative to its peripheral ports concurrently so that the overall throughput of data relative to all devices can be sustained at a higher rate than it could be if the peripheral bus were a single physically continuous entity.

In another application of this partitioned port arrangement, storage devices intended for exclusive use and control by the host computer system, but which would be directly accessible to other devices following normal practices of the peripheral bus architectural standard, are isolated from the external devices by having the internal and external devices coupled to different peripheral ports of the adapting unit.

A feature of the invention particularly applicable to the above-mentioned SCSI bus derives from the fact that in contemporary computer systems, the housing enclosing the computer and its power supply can be used to house and power the adapting unit, several "internal" devices and segments of the peripheral/SCSI bus linking those devices to the adapting unit. Other "external" devices linked to the peripheral bus are located outside of this housing. In this environment, the spacing between the adapting unit and the internal devices is tightly controllable by the designers of the computer system, whereas the spacing between the same unit and the external devices in general is left for determination by system users and is therefore not determinable by those designers. Thus, the internal and external devices are configurable to present impedance conditions relative to the adapting unit which are respectively controllable by and beyond the control of the computer system designers. Accordingly, by partitioning the adapting unit to serve the internal and external devices separately, the rate of data transfer relative to the internal devices can be optimized without concern for distortions associatable with external impedances of the same SCSI bus.

DETAILED DESCRIPTION

1. Introduction

Figure 1:
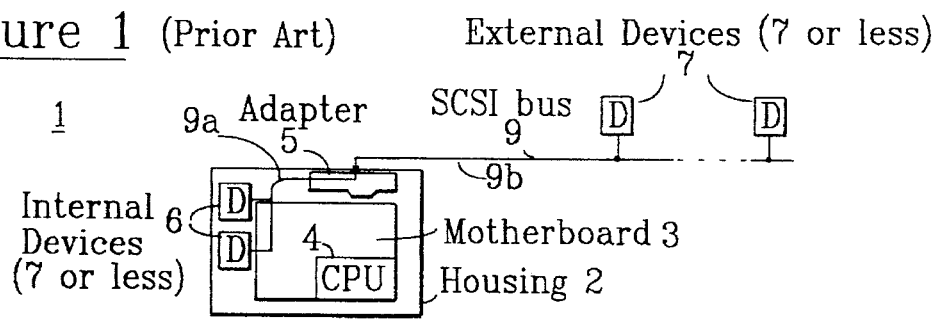
FIG. 1 schematically illustrates a prior art "unpartitioned" SCSI bus arrangement for a computer system.

Problems addressed by the present invention are explainable with reference to the conventional computer system and (prior art) SCSI bus arrangement shown in FIG. 1. In that FIG., 1 indicates the system and bus arrangement generally. The "motherboard" of the system, and the CPU (central processing unit) of the system which resides on the motherboard, are shown respectively at 3 and 4. I/O (input/output) adapter unit 5, shown as a card that plugs into the motherboard, links the system to some of its peripheral devices, shown at 6 and 7, through a physically continuous SCSI (Small Computer System Interface) bus cable shown at 9. Devices 6 and 7 are respectively designated as internal and external devices; the internal devices being enclosed within housing 2 (and potentially powered with the CPU and other system elements enclosed by the housing), and the external devices being located physically outside of the housing. Devices 6 are connected to internal section 9a of bus 9, and devices 7 are connected to external section 9b of the same bus. Bus sections 9a and 9b are interconnected as shown.

Other parts of the system, which are mounted upon or connected to the motherboard 3 but are not shown to simplify the illustration, include system memory (random access and read only), timing controls, a system I/O bus which links the system to its peripheral device adapters including adapter 5, and possibly additional internal devices besides those shown at 6 (e.g. disk drive and diskette drive storage devices which are not linked to SCSI bus 9). A typical "host" computer for such a system could be an IBM Personal System/2 (or PS/2) type system[2], and devices 6 and 7 typically may include disk drive storage devices, printing devices, etc., having "intelligent controls" configured in accordance with the SCSI standards. As indicated in the drawing, the system and bus 9 are capable of supporting a combination of up to 7 internal and external devices (all linked to daisy-chained segments of bus 9).

[2]IBM, Personal System/2 and PS/2 are Trademarks of the International Business Machines Corporation.

Various problems arising from the continuous nature of the bus 9 are explained next.

1A. Signal Distortion Problem

It should be understood, in general, that internal devices 6 would be much closer to each other and to adapter 5 than external devices 7 are to each other and the adapter. Furthermore, it should be understood that factors affecting the impedance and signal distorting properties on the internal section 9a of bus 9 (lengths of bus segments between devices, couplings to individual devices, etc.) are, in general, much more controllable by designers of internal parts of system 1 than comparable factors affecting impedances of the external section 9b.

Furthermore, it is noted that design parameters of the devices 6 and 7 which may affect the integrity of data communicated over the bus 9 are difficult for system designers to control; for instance, it may not be possible to ensure that any of such devices have internal logic which could compensate for errors due to signal distortion. Also, in systems lacking error detection capability, errors due to signal distortion can give rise to system errors or failures which may be difficult or even impossible to trace.

Thus, it is understood that the rate of data throughput over the entire length of bus 9 is limited of necessity by the rate at which data signals can be transferred over and intelligibly received from the external section 9b; or, as a corollary, that the unified bus arrangement as shown in FIG. 1 may not allow for optimal usage of internal devices 6.

1B. Data Security/Integrity Problem

In the foregoing environment, security of data stored on internal disk drives that are connected to bus section 9a may be compromised.

The SCSI architecture allows for two-way communication between devices attached to the bus. Accordingly, data stored on internal disk drives, which is intended to be used primarily by CPU 4 and associated internal processing elements of system 1, may become subject to modification by external devices in a manner not contemplated by the designers of the internal system configuration.

1C. Problem of Bus Width and Load Restrictions

Early versions of the bus architecture define the bus conductors as consisting of 8 data leads, for parallel transfer of 8 bits of data at a time, and a defined number of control leads for controlling such transfers. Relative to internal devices, and the internal bus segments, which have a form and spacing determinable by the computer system designer, it may be desirable to allow for parallel transfer of larger units of data (e.g. 16 or 32 bits at a time).

Similarly, it may be seen that the device load limitations suggested in FIG. 1, of no more than seven device loads on the entire bus 9 may be unduly restrictive.

1D. Problem of Optimal Bus Utilization

Another constraint associated with the unified bus arrangement of FIG. 1 is that data transfers between the host computer and the bus sections are restricted by the bus configuration. Thus, it is difficult to achieve optimum concurrency of data transfers over both the internal and external bus sections.

2. Present Invention

Figure 2:
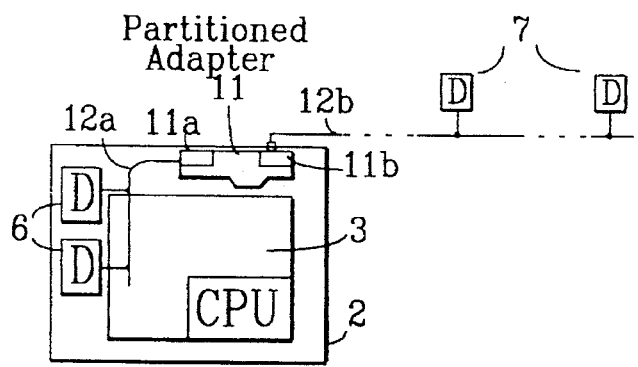
FIG. 2 is a schematic of a partitioned SCSI bus arrangement in accordance with the invention, for use in the system of FIG. 1.

As shown in FIG. 2, the present invention addresses these problems by partitioning the bus and bus adapter unit. Adapter unit 11 contains controller sections 11a and 11b which interface to respective bus sections 12a and 12b, to provide the present functions. Although only a two-way partition is shown and described here, it should be understood that principles to be disclosed are useful to sustain equivalent functions relative to more than two partitions.

Figure 3:
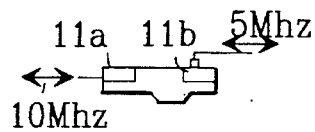
FIGS. 3–6 schematically illustrate various applications of the bus arrangement of FIG. 2 in accordance with the invention.

FIGS. 3–6 illustrate how adapter 11 can be used to avoid the problems discussed earlier. FIG. 3 shows use of adapter sections 11a and 11b to sustain different rates of data transfer on bus sections 12a and 12b (10 Megahertz on internal section 12a and 5 Megahertz on external section 12b), so as to avoid excessive signal distortion on the external section, while permitting optimal usage of internal devices 6.

Figure 4:
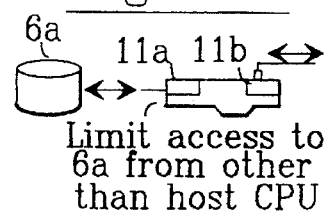

FIG. 4 shows how the adapter partitions can be used to restrict access to internal disk storage device 6a to the host CPU exclusively.

Figure 5:
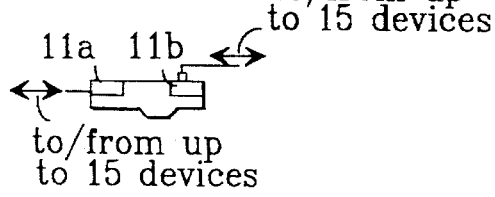

FIG. 5 shows how the partitions can be operated to increase the number of devices that can be served by the adapter (to a maximum of 30 devices, compared with the maximum of 7 indicated in FIG. 1).

Figure 6:
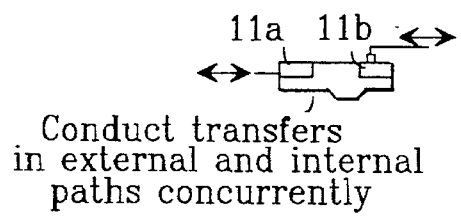

FIG. 6 shows how the partitions can be used to allow for concurrent transfers over the internal and external bus segments.

Other uses will be described later with reference to FIGS. 9–11.

Figure 7:
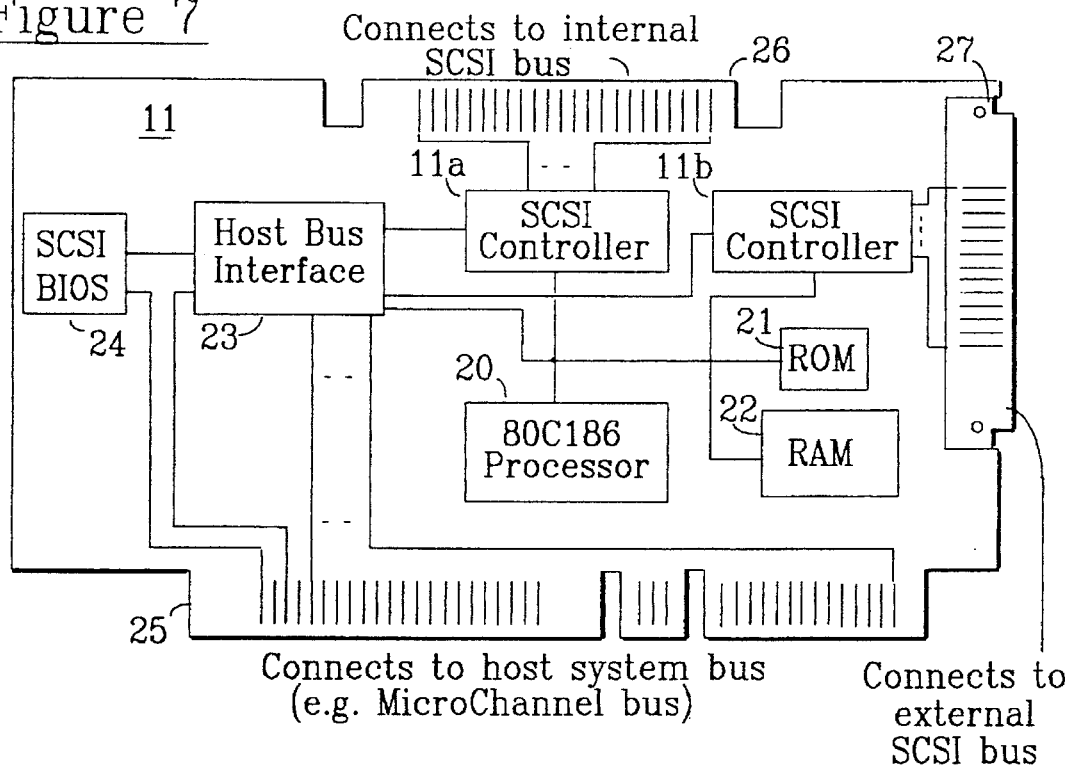
FIG. 7 schematically illustrates a preferred construction of an adapter unit/card for the bus arrangement of FIG. 2.

FIG. 7 illustrates elements of a preferred embodiment of adapter 11. Although this adapter is shown here as a card, which plugs into a not-shown socket on the host-system motherboard, it should be understood that the components of such a card (integrated circuit chips and connective members), could be integrated directly onto the motherboard.

In addition to bus controller sections 11a and 11b, card 11 contains a microprocessor 20, read only memory (ROM) 21, random access writable memory (RAM) 22, host bus interface unit 23, another ROM memory unit 24 for storing BIOS (Basic Input Output System) control information, and connector extensions 25–27. Connector 25 links to the host system and connectors 26 and 27 respectively couple to internal and external sections of the SCSI bus (12a, 12b).

Microprocessor 20, which may consist primarily of an Intel 80C186 processor module as shown, directs logical operations of units 11a, 11b, 23 and 24, under control of commands stored in RAM 22 and microprograms stored in ROM 21. Unit 23, in cooperation with units 11a, 11b, and 24, directs the flow of data signals between host connection interface 25 and peripheral connection interfaces 26 and 27. Data en route between host interface 25 and internal SCSI bus interface 26 is handled through units 23 and 11a, and data en route between interface 25 and external SCSI bus interface 27 is handled through units 23 and 11b. Unit 23 has not-shown buffers for storing data in transit relative to interface 25, and units 11a and 11b have not-shown buffers for storing data en route between unit 23 and respective SCSI interfaces 26 and 27.

Connector extension 25 plugs into a socket on the host system motherboard, and couples via that socket to an I/O bus (e.g. to a Micro Channel[3] bus in a PS/2 host system) which links the host system to peripheral device adapter units including card 11. Connector extensions 26 and 27 pluggably attach to ends of SCSI cable segments.

[3]Micro Channel is a Trademark of the International Business Machines Corporation.

Figure 8:
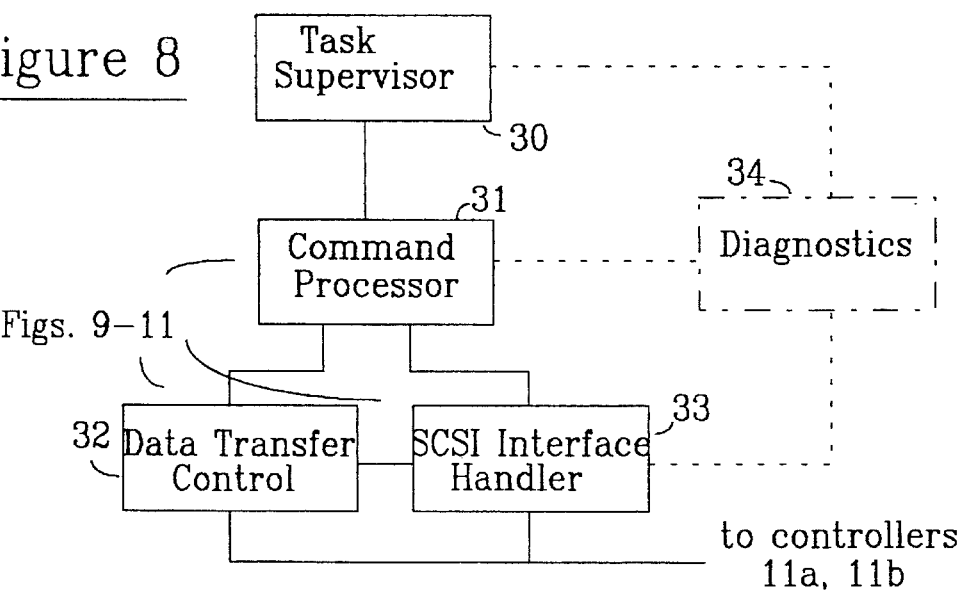
FIG. 8 is a block diagram showing a microprogram organization for directing operations of the adapter card of FIG. 7.

As suggested in FIG. 8, the microprogram directing operations of card 11 (through microprocessor 20) may be organized in a hierarchy of modules 30–33; including a task supervisor module 30, a command processor module 31, a data transfer control module 32, and a SCSI interface handler module 33. The microprogram may also contain diagnostic elements not relevant to the present invention, as suggested in phantom at 34.

Task supervisor 30 initializes the card subsystem (in a process which may involve conduct of tests under direction of diagnostics 34), and coordinates all major tasks performed by the subsystem. Command processor 31 directs execution of commands defining I/O operations performed between the host system interface and the devices linked to the SCSI bus(es). Command processor 31 directly controls operations of host bus interface unit 23 (FIG. 7) and interacts with modules 32 and 33 to direct operations of controller units 11a and 11b (FIG. 7).

Data transfer controller 32 controls data transfer operations of controllers 11a and 11b relative to the SCSI bus. SCSI interface handler module 33 attends to control signalling functions between controllers 11a and 11b and devices linked to the SCSI bus; including the handling of interruption and other requests received at the SCSI bus interfaces.

Presently relevant operations of these modules are described next with reference to flow diagrams in FIGS. 9, 9A, 9B, 10 and 11. FIGS. 9, 9A and 9B together illustrate command processing and device configuring operations directed by module 31. FIG. 10 illustrates device initialization operations directed by module 32. FIG. 11 illustrates interrupt handling functions directed by module 33.

Figure 9:
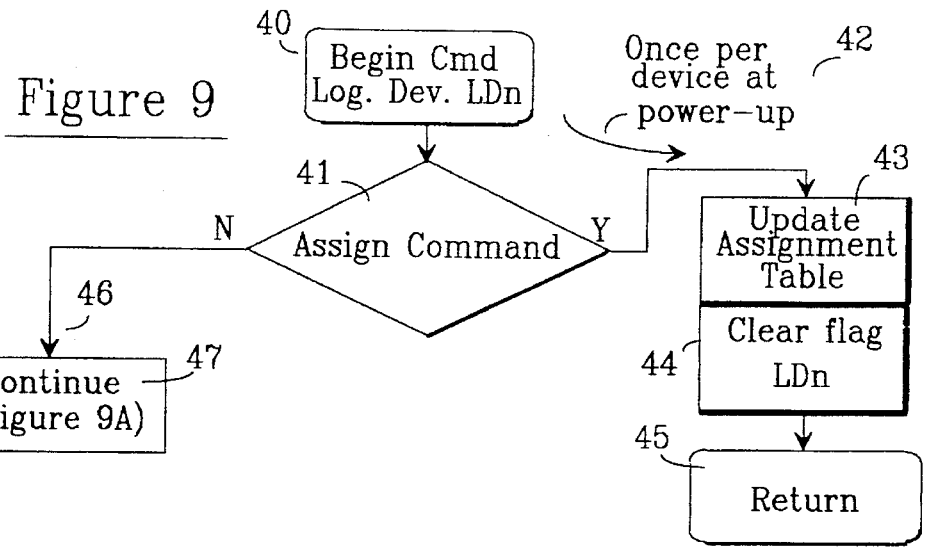
FIGS. 9–11 are flow diagrams for explaining operations of the microprogram outlined in FIG. 8 that are considered relevant to the present invention; with FIGS. 9A and 9B illustrating details of an operation indicated in very general form in FIG. 9.
Figure 9A:
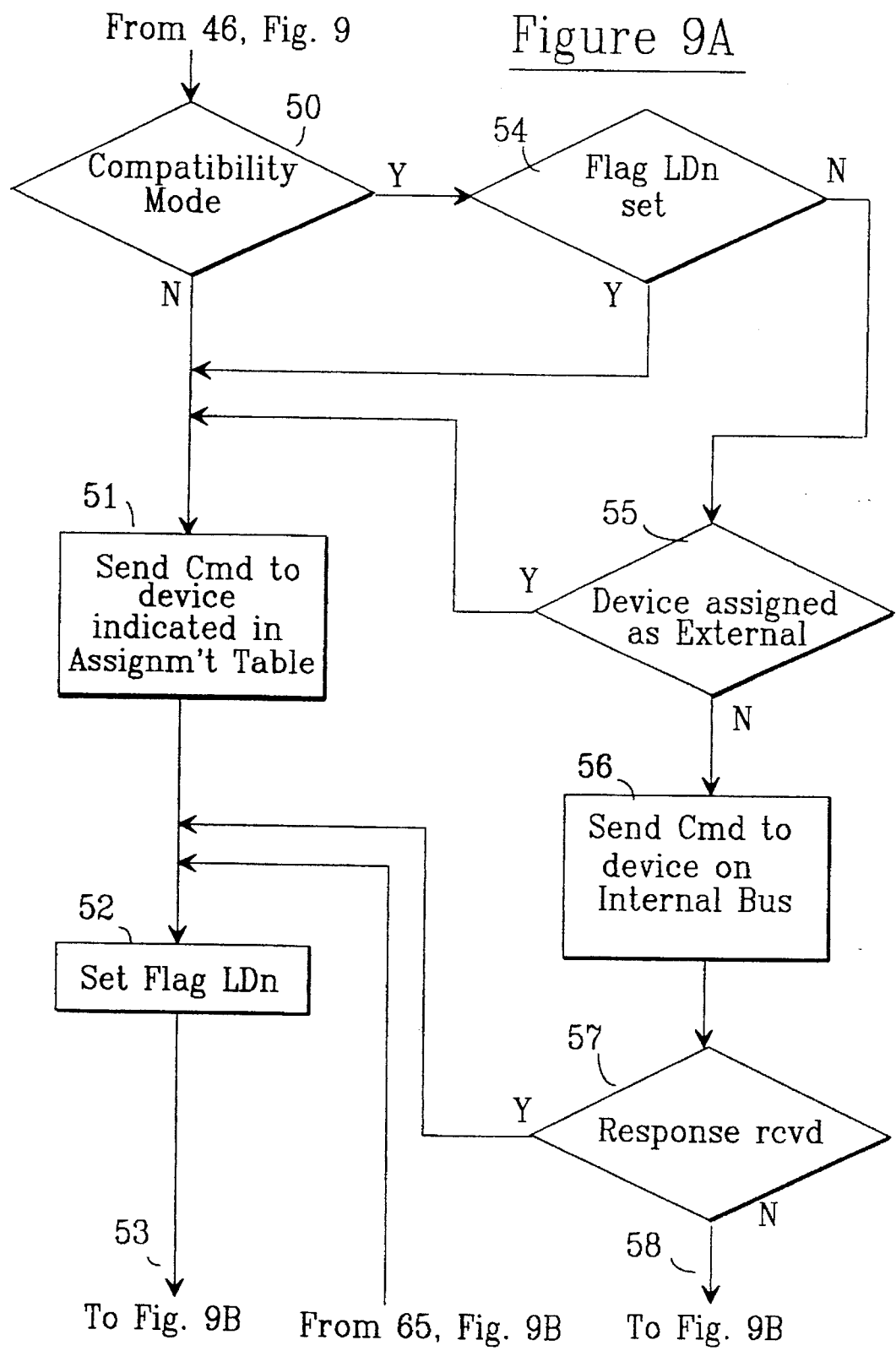
Figure 9B:
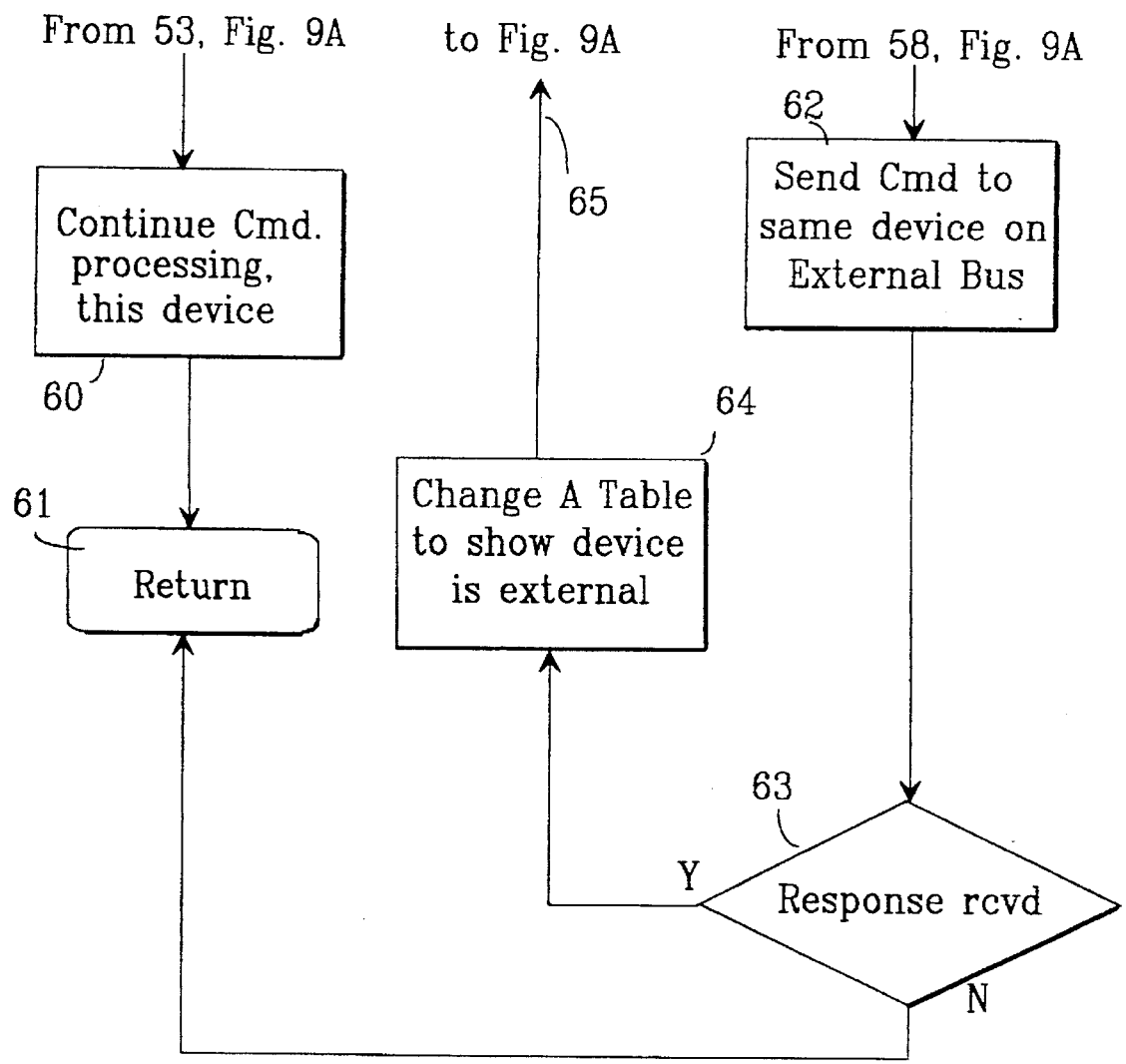

Referring to FIG. 9, I/O commands are executed relative to individual logical devices (LDn). Command execution begins at 40, and branches to one of two sequence paths at 41; one path for "Assign" commands and the other for all other commands. Assign commands are performed during card subsystem initialization (under prompting by the host system). As shown at 42, one Assign command is executed relative to each device served by the subsystem. As shown at 43, in the Assign sequence the command processor updates an Assignment Table (in RAM 22, FIG. 7) with information about the respective device (obtained by prior actions evoked by the interface handler 33). As shown at 44, if operation 43 is completed successfully, a Flag associated with the respective device is cleared in order to indicate that the device has been initialized and has not yet received a command (to transfer data, etc.). As shown at 45, when these operations are completed, control is returned e.g. to task supervisor 30.

Information entered into the Assignment Table in operation 43 typically includes the SCSI address (ID) of the peripheral device, the logical device number LDn assigned to the device, and the bus section (internal/external) to which the device is physically connected.

When executing a command other than an Assign command, command processor 31 takes sequence path 46 to operating sequence 47, details of which are shown in FIGS. 9A and 9B. Sequence connections between lines extending through these figures are indicated explicitly by numbers.

Referring to FIG. 9A, the sequence associated with other commands begins at 50 with a branch determined as a function of the current operating mode of the host system. In this branch, the command processor takes one sequence path if the host system is operating in compatibility mode and the other if another path if the host system is not operating in that mode. The command processor determines the operating mode of the host system by inspecting settings in configuration registers on the card (e.g. in unit 23) that are initialized by the host system.

In compatibility mode, the host system is controlled by (operating system and configuration) software which views the adapter 11 and its devices effectively as if they are situated along a single continuous (unpartitioned) path. This means that the card susbsystem, in its operations relative to the host system, must support to effectively allow the host to maintain this unified view of the the SCSI bus sections. It also means that in this mode the card subsystem can only support operations relative to the maximum number of devices allowed on a unified bus (i.e. 7 devices in the arrangement of FIG. 1).

When the host system is not in compatibility mode (also termed "non-compatibility" mode herein), it views the card 11 and its attached peripherals in their true partitioned configuration (and therefore it and the card may also support more peripherals; e.g. 30 as suggested in FIG. 5).

Accordingly, when the host system is in compatibility mode, the card subsystem must maintain an Assignment Table in which its physical device addresses may differ from the logical addresses used by the host, and in which the physical device addresses indicate the true physical positions of respective devices (e.g. external/internal) and their true data transfer modes (e.g. fast/slow).

The sequence path taken by the command processor at 50 for "non-compatibility mode", comprises operations 51 and 52, the latter continued via path 53 with other actions and operations shown in FIG. 9B. The sequence path for "compatibility mode" comprises actions and operations 54–57 that also extend to continuation operations shown in FIG. 9B. In effect, the actions and operations performed for compatibility mode serve to "retrofit" the partitioned configuration of the card in a manner which is transparent to the host system. Thus, for this mode, the command processor must be able to determine the correct physical bus path for communicating with the card (e.g. external/internal).

In performing operation 51, after determining at 50 that the host is in non-compatibility mode, the card logic assumes that the local Assignment Table, as currently set, indicates the actual physical location of the logical device (LDn) to which the command is directed, regardless of the state of the associated device Flag (see operation 44, FIG. 9), and uses the location indicated in that table to have command information sent to the associated device via the appropriate bus section. The assumption indicated in the preceding sentence is reasonable because the local Assignment Table on the card is set initially in accordance with Assign commands originated by the host system, and should retain that setting since it conforms to the true physical configuration of the subsystem. In operation 52, the flag assigned to the associated device is set so as to indicate that this device has been initialized and received at least one command.

For compatibility mode, the command processor sequence branches at 54 on the state of the flag associated with the targeted device LDn. If that flag is in a set state (indicating that at least one command has been sent to this device since card initialization), the Y (yes) branch is taken at 54 to operation 51 discussed earlier, so that the command is sent to the device via the path currently specified in the local Assignment Table, and continued via sequence path 53 with actions and operations shown in FIG. 9b.

If the flag of target device LDn is in a cleared state when examined at 54, the N (no) path is taken to determination 55 which distinguishes the device's location (External or not External) as currently listed in the Assignment Table. If the device is listed currently as external (i.e. linked to external bus section 12b), operation 51 is performed to send the command via the external bus section to the physical device address currently indicated in the Assignment Table. If the device is not explicitly assigned to the external bus section, operation 56 is evoked to attempt to have the command sent to the device via the internal section of the bus (this is characterized as an "attempt" because at this stage of the sequence the device targeted by the host may be connected to either the external or internal bus segment), and the sequence branches at 57 on the results of that attempt.

If the attempt is successful (device responded via internal bus), operation 52 is performed to set the flag of the target/responding device and continue the command sequence associated with that action (FIG. 9B). If the attempt was unsuccessful, N (no) branch is taken to another phase of the command sequence shown in FIG. 9B via line 58 connecting to that Figure.

Referring to FIG. 9B, the continuation of the command sequence from point 53 in FIG. 9A comprises operation 60 and return/ending function 61. The continuation of that sequence from point 58 in FIG. 9A comprises actions 62 and 63, and either return function 61 or further operations 64 and 52 (in FIG. 9A, via linking path 65).

Operation 60 continues the command process initiated at 51 in FIG. 9A through its appropriate normal sequence (for example, to return status information to the system), and then control is returned e.g. to the task supervisor at 61. In operation 62, which is evoked after an unsuccessful attempt to send the command to the target device via the internal bus (via operation 56 in FIG. 9A) based on the current information in the local Assignment Table, an attempt is made to send the command via the external bus, and the sequence branches according to the result of this action.

If attempt 62 is successful (response received from device), the Assignment Table entry relative to the target device is modified via operation 64, to indicate its linkage to the external bus, and the sequence continues via line 65 to operation 52 in FIG. 9A, thereby setting the flag for the respective device and linking to "normal" continuing operations 60 in FIG. 9B. If attempt 62 is unsuccessful an error is posted (since the device is not contactable on either bus section) and the operation ends at 61.

Figure 10:
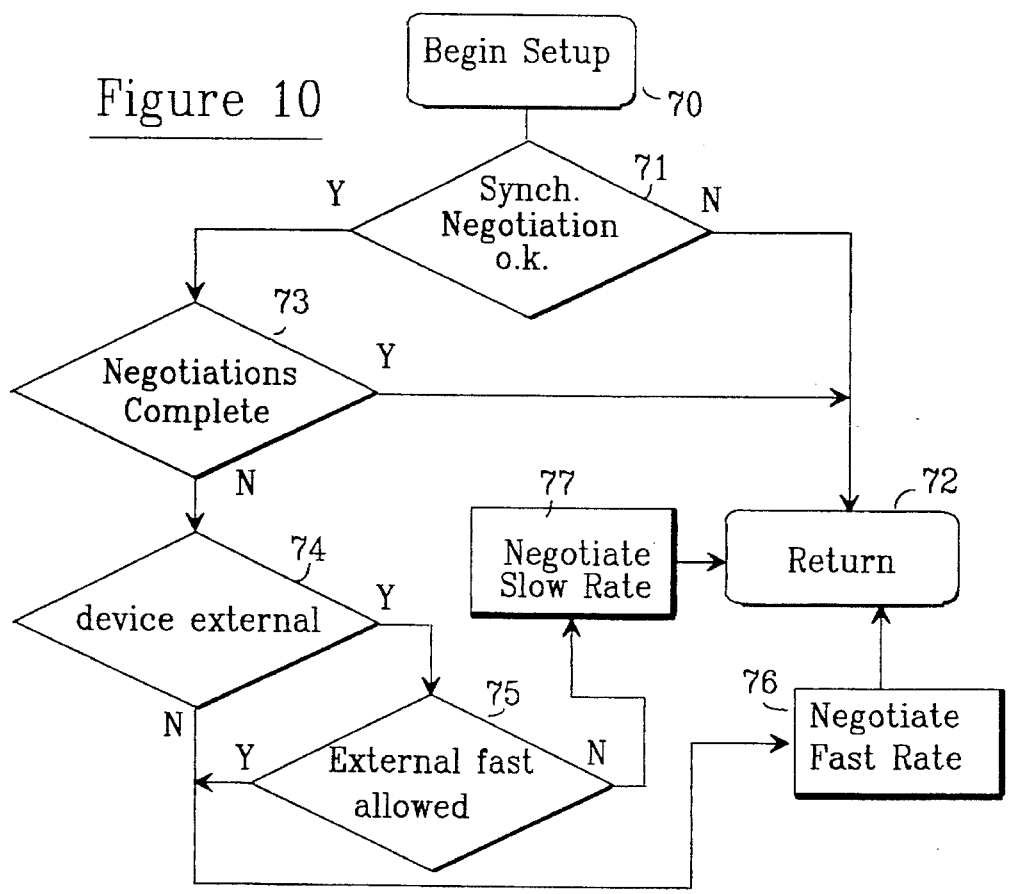

FIG. 10 illustrates relevant parts of initial operations that are used by the card subsystem to cause "rate negotiation" signals to be exchanged between the subsystem and selected devices for enabling the subsystem to determine if it should pace data transfers between it and the device at a nominal "low" rate, associated with the external section of the SCSI bus, or at a higher rate associated with all or part of the internal section of the bus. In general, the selected devices are devices linked to portions of the SCSI bus sections on which transfer of data at the higher rate is considered "safe" (unlikely to have signals distorted beyond recognition), taking into account the number of devices currently attached to that section, etc. These negotiations may be initiated either by the card, during its initialization process, or by devices in the select "category" at any time.

Starting at 70, the subsystem determines at 71 if a given device is in the select category permitting it to operate at either the nominal low rate or the higher rate. If a device is not in that category the operation concludes via return 72. If the device can negotiate, the negotiation is carried out beginning with determination at 73 of whether or not the negotiation has been completed. Determination 73 is required in order to ensure that multiple negotiations are not performed relative to the device. If determination 73 indicates prior completion of the negotiation, through this or another sequence path, the sequence is ended via return 72.

If the negotiation is not yet complete at the time of determination 73, the process continues with determination 74. At 74, a determination is made of which bus section couples to the device. If the device is external (determination Y at 74), determination 75 is made, but if the device is internal operation 76 is evoked to complete negotiation of the higher rate, and the sequence is then concluded via return 72.

The subsystem uses determination 75 to ascertain if the higher rate can be used safely relative to this (external) device (based on the device type and the current state of loading of the external bus, as indicated in the configuration registers set by the host system). If the higher rate can be used, negotiation of that rate is completed via action 76 and the sequence is thereafter concluded via return 72. If the higher rate can not be used, the negotiation of the lower rate is concluded via operation 77, and the sequence concludes via return 72.

Figure 11:
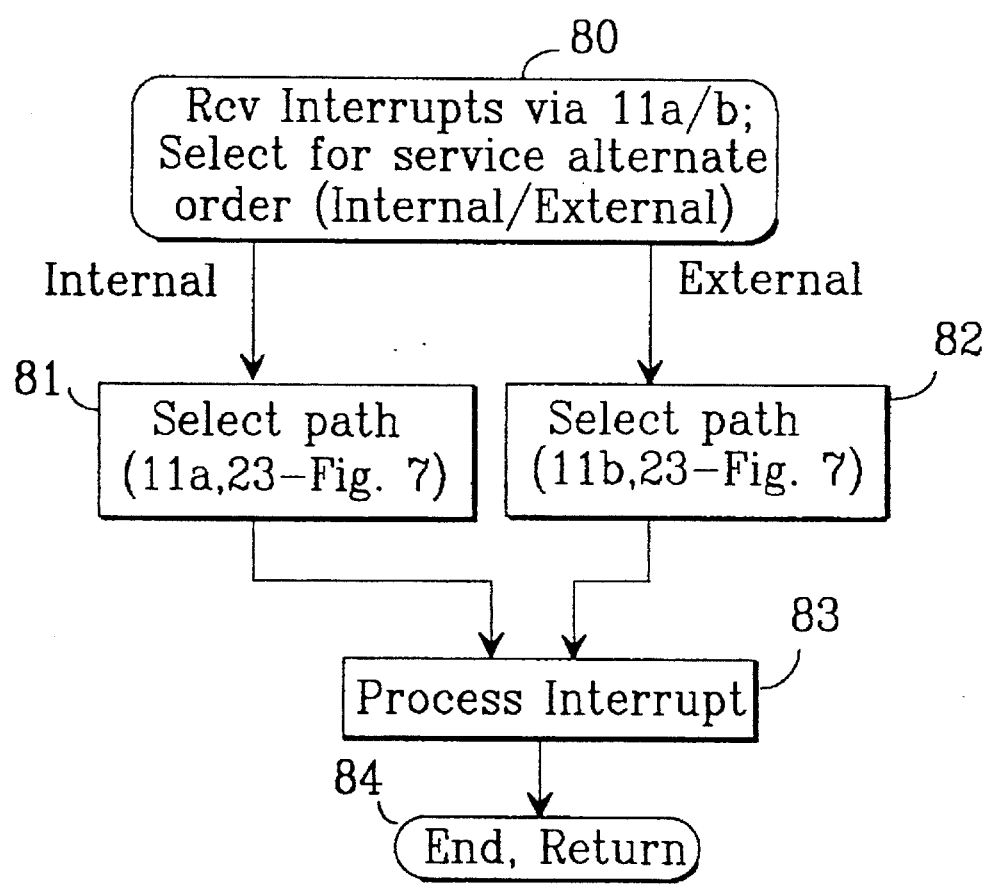

FIG. 11 characterizes the handling (by module 33, FIG. 8) of device interruption requests (received by adapter controller sections 11a, 11b at their interfaces to SCSI bus sections 12a, 12b). As indicated at 80, handler 33 selects these requests using an alternating preferential sequence which alternately favors requests from internal and external devices. By this we mean, that if the last order of preference was internal first and external next (or external first and internal next), and the last request actually handled was internal (or external), the order of preference for the next request will be reversed to external first and internal next (or respectively internal first and external next).

In the actual handling of requests, a data transfer path within the subsystem is selected via action 81 or 82, for transferring data between the requesting device and the host system via unit 23, and an associated data transfer process 83 is conducted relative to that path. Thus, if the request is from an internal device, a path is selected at 81 through controller 11a and unit 23, and data is transferred between the device and an assigned address in host system memory via that path. As noted previously, data so transferred is temporarily stored in (not-shown FIFO) buffer registers in units 11a and 23. On the other hand, if the request is from an external device, a path is selected at 82 between the device and an assigned address in host system memory through (not-shown FIFO buffers in) units 11b and 23.

It is understood of course that the handling of such data transfers on the card depends on the negotiated rate, and that data handling capabilities appropriate to that rate are used.

The foregoing and other aspects, advantages, and benefits of the invention may be further appreciated from the following claims.

What is claimed is:

1. A bus adapting system, for connecting a computer to a physically partitioned but logically unified bus, said bus having first and second bus segments that are physically separate from each other, each of said bus segments being useful for attaching to peripheral devices in varied configurations, said bus adapting system comprising:

an adapter unit for connecting said computer separately to each of said first and second bus segments, said adapter unit being useful to isolate said bus segments from the computer to differing extents, as well as from each other, so that operations of the computer relative to devices attached to any one of said first and second bus segments cannot be compromised by devices attached to the other of said first and second bus segments, said adapter unit comprising:

circuit means having physically separate first and second circuit paths linking respectively to said first and second bus segments, said circuit means being useful to conduct data signalling operations between said computer and each of said first and second bus segments, over said respective first and second circuit paths, using identical operating protocols relative to both of said first and second bus segments; each of said first and second bus segments being connectable to at least one device requiring communication with the computer; the first bus segment being physically closer to said computer than the second bus segment; the first segment having a predetermined length and connecting only to devices for transferring data at a predetermined first rate; and the second segment having a variable length and connecting only to devices for transferring data at a rate less than said first rate said circuit means being designed to transfer data relative to said first bus segment at said first rate and to transfer data relative to said second bus segment at a rate less than said first rate.

2. A bus adapting system in accordance with claim 1 wherein said partitioning adapter unit further comprises:

means for controlling transfers of data between said computer and said first and second segments at respective first and second data transfer rates, where the first rate is greater than the second rate.

3. A bus adapting system in accordance with claim 2 wherein each of said bus segments is connectable to plural peripheral devices within a predefined limiting number of devices.

4. A bus adapting system in accordance with claim 2 wherein said computer is located within a housing enclosure having sockets reserved for attachment of some of said peripheral devices and wherein:

said first bus segment and said adapting system are contained within said enclosure and said second bus segment is located outside said enclosure.

5. The bus adapting system of claim 4 wherein said adapter unit interfaces between said computer and said first and second bus segments, said adapter unit cooperating with said computer to make said first and second bus segments appear to said computer as a single logically continuous bus entity although said segments are physically and electrically separated from said computer and from each other.

6. A bus adapting system having compatible and incompatible modes of operation, for connecting a computer to a bus, said bus being useful for attaching to peripheral devices in varied configurations, said bus adapting system operating while in said compatible mode in a manner compatible with software used by said computer when said computer is not connected to said bus adapting system, said bus adapting system operating while in said incompatible mode in a manner potentially incompatible with said software used by said computer when not connected to said bus adapting system, said bus adapting system comprising:

an adapter unit for effectively partitioning said bus into first and second physically separate bus segments which are made isolatable from the computer to differing extents by operation of said adapter unit, so that operations of the computer cannot be compromised by devices that operate in a manner incompatible or inconsistent with the computer or a current configuration of the bus, said adapter unit comprising:

circuit means for linking said computer to each of said first and second bus segments, said circuit means using identical operating protocols relative to both of said segments; each of said bus segments being connectable to at least one device requiring communication with the computer; the first segment being physically closer to said computer than the second segment; the first segment having a predetermined length and connecting only to devices for transferring data at a predetermined first rate; and the second segment having a variable length and connecting only to devices for transferring data at a rate less than said first rate;

means for controlling transfers of data between said computer and each of said bus segments; said controlling means transferring data relative to said first bus segment at said predetermined first rate, said controlling means transferring data relative to said second bus segment at a second rate less than said first rate;

means, operative in said compatible mode, for requiring said computer to restrict its assignment of logical identities to said devices in a manner ensuring that said devices are uniquely identifiable to said software used by said computer when said computer is not connected to said adapter system; said incompatible mode not requiring such restriction of identity assignment relative to said software; and wherein said adapter unit includes:

means cooperative with said computer in said compatible mode to allow for operations of said computer to be directed to devices linked to said first and second bus segments, while the computer is directing such operations to devices that are effectively assumed by said software used by said computer to be linked to a single continuous bus.

* * * * *